United States Patent [19]

Butler

[11] 4,375,343
[45] Mar. 1, 1983

[54] RAILCAR TRANSPORTING TRAILER
[75] Inventor: William S. Butler, Burleson, Tex.
[73] Assignee: Halliburton Company, Duncan, Okla.
[21] Appl. No.: 180,727
[22] Filed: Aug. 25, 1980
[51] Int. Cl.³ .......................... B60P 1/22; B60P 3/07; B61D 47/00
[52] U.S. Cl. ........................................ 414/508; 410/3; 414/538
[58] Field of Search .................. 105/355; 410/2, 3, 4; 414/494, 537, 538, 559, 508

[56] References Cited

U.S. PATENT DOCUMENTS

| | | | |
|---|---|---|---|
| 2,058,955 | 10/1936 | Culemeyer | 410/4 X |
| 2,659,504 | 11/1953 | Kranametvogel et al. | 414/538 X |
| 2,765,938 | 10/1956 | Di Addezio | 414/538 |
| 2,900,094 | 8/1959 | Ferguson | 414/537 |
| 3,076,569 | 2/1963 | Lutts, Jr. | 414/537 |
| 3,153,489 | 10/1964 | Leavengood et al. | 414/537 |
| 3,257,020 | 6/1966 | Fairclough | 414/538 |
| 3,613,919 | 10/1971 | Ceepo et al. | 414/538 X |

FOREIGN PATENT DOCUMENTS 220576  9/1958  Australia .............................. 414/537

Primary Examiner—Robert B. Reeves
Assistant Examiner—Howard Beltran
Attorney, Agent, or Firm—James R. Duzan

[57] ABSTRACT

A railcar transport for use with a truck tractor towing means comprising a trailer having an elongated rectangular frame having the rails thereon located on the longitudinal side frame members, having a railcar ramp secured to one end thereof, having a power winch mounted on the other end thereof to pull railcars thereon, having a rail alignment mechanism on one end the trailcar ramp mounted between the rails thereon, and having railcar ramp articulation means which are mounted either at the ramp pivot point or therebelow.

12 Claims, 11 Drawing Figures

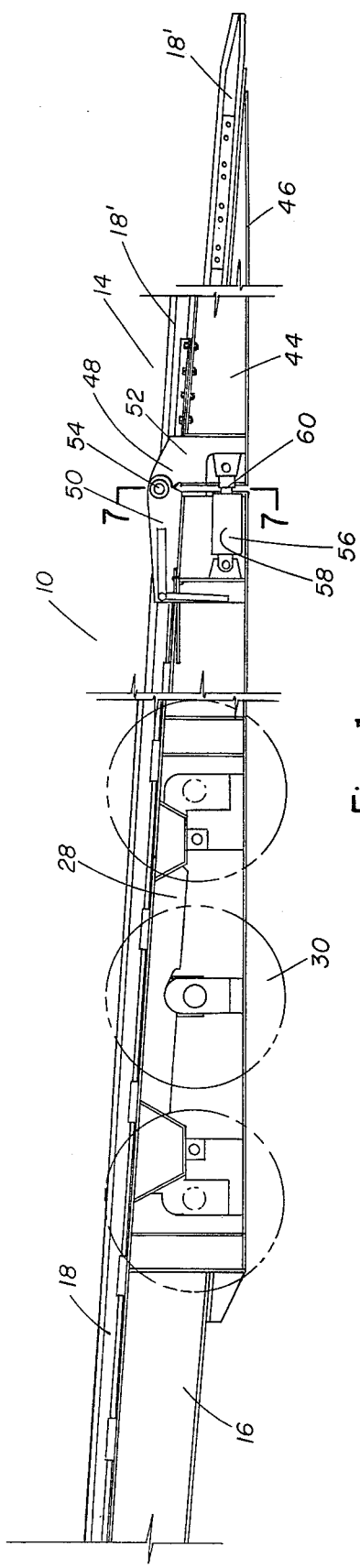
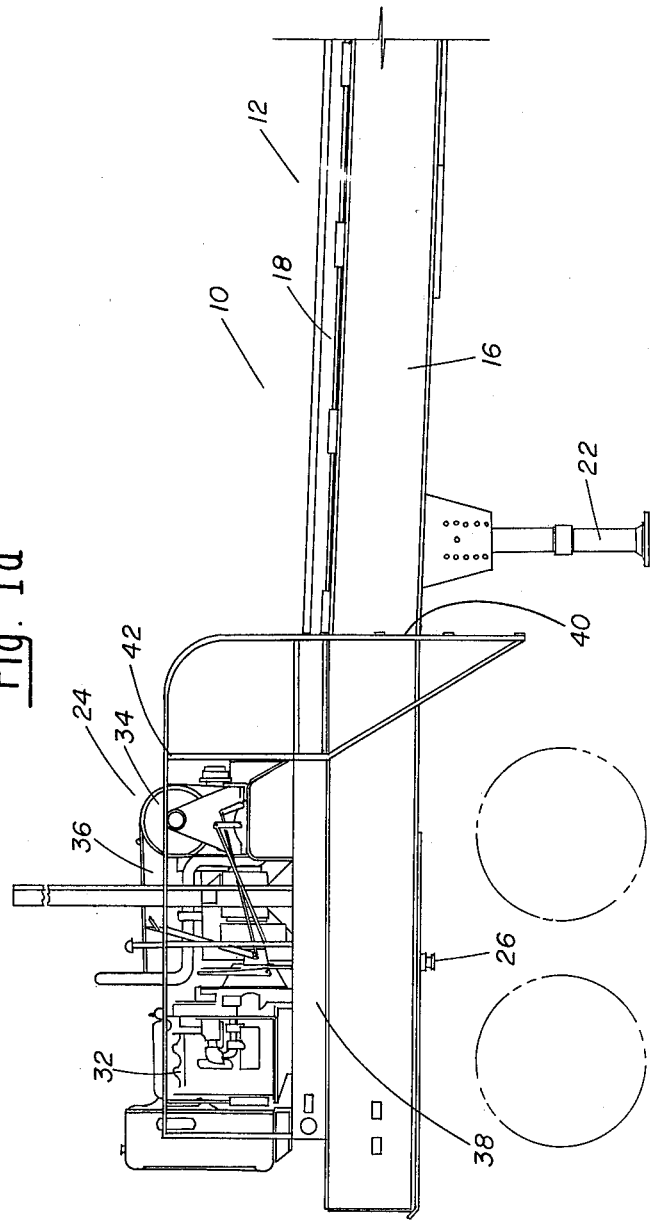
Fig. 1a
Fig. 1

RAILCAR TRANSPORTING TRAILER

BACKGROUND OF THE INVENTION

This invention relates to an improved railcar transport.

In some instances it is desirable to move railcars over the road to railcar repair facilities or to move railcars about railcar repair facilities or wherever desired without having large amounts of space devoted to trackage and switching facilities.

In order to transport railcars over the road and about various facilities, it is desirable to utilize a transport trailer capable of hauling a wide variety of railcars thereon without modification.

One such prior art railcar transport trailer comprises a trailer for use with a suitable truck tractor towing means. The trailer comprises an elongated rectangular frame having a pair of rails located inboard of the longitudinal side frame members of the frame on the frame cross members, having a railcar ramp secured to one end thereof and having a power winch mounted on the other end thereof to pull railcars thereon. The trailer also includes a rail alignment means on one end of the railcar ramp comprising a hydraulic cylinder mounted on a bracket secured on one side of the railcar ramp having the piston rod thereof secured to one of the rails with motion being transmitted to the other rail by means of a linkage. The railcar ramp is raised and lowered by means of a pair of hydraulic cylinders each having one end thereof secured to a vertically upward extending beam from the rear of the railcar trailer and the other end secured by means of a linkage to the railcar ramp near the point of attachment of the ramp to the rectangular frame, thereby having the hydraulic cylinders mounted above the pivot point of the ramp where it is secured to the elongated trailer frame. The trailer further includes rigidly mounted wheels and axles thereon with no provision for any type of suspension means, thereby causing the trailer to be suitable only for use at very low speeds on smooth surface.

STATEMENT OF THE INVENTION

In contrast to the prior art, the present invention is directed to a railcar transport suitable for use with a truck tractor towing means comprising a trailer having an elongated rectangular frame having the rails thereon located on the longitudinal side frame members, having a railcar ramp secured to one end thereof, having a power winch mounted on the other end thereof to pull railcars thereon, having rail alignment means on one end of the railcar ramp mounted between the rails thereon, and having railcar ramp articulation means which are mounted either at the ramp pivot point or therebelow. The rail alignment means on one end of the railcar ramp comprises a hydraulic cylinder mounted between the rails on the ramp having one end thereof engaging one of the rails which the rails are linked together by a linkage. The railcar transport further includes suspension means connecting the wheels and axles to the trailer's rectangular frame, thereby allowing the transport to be used at high speeds and on rough surfaces.

By placing the rails on the longitudinal side frame members of the elongated rectangular frame of the railcar transport, it is not necessary to utilize heavy cross members on the elongated rectangular framework for rail support thereby increasing the load carrying capacity of the railcar transport.

Also, by articulating the railcar ramp utilizing a power means mounted at either the ramp pivot point or therebelow, the railcar ramp may be moved through a greater angle or the end thereof elevated to a higher position and the rails on the railcar ramp and elongated rectangular framework are not obstructed by members extending thereabove.

BRIEF DESCRIPTION OF THE DRAWINGS

The foregoing invention and its advantages will be more fully understood from the following description of the invention taken in conjunction with the drawings wherein:

FIG. 1 is a side view of a portion of the front portion of the railcar transport.

FIG. 1a is a side view of a portion of the rear portion of the railcar transport.

FIG. 4 is a cross-sectional view taken along line 4—4 of FIG. 2a.

FIG. 5 is a cross-sectional view taken along line 5—5 of FIG. 2a.

FIG. 6 is a view taken along line 6—6 of FIG. 2a.

FIG. 7 is a cross-sectional view taken along line 7—7 of FIG. 1a.

DESCRIPTION OF THE INVENTION

Figure 2A:
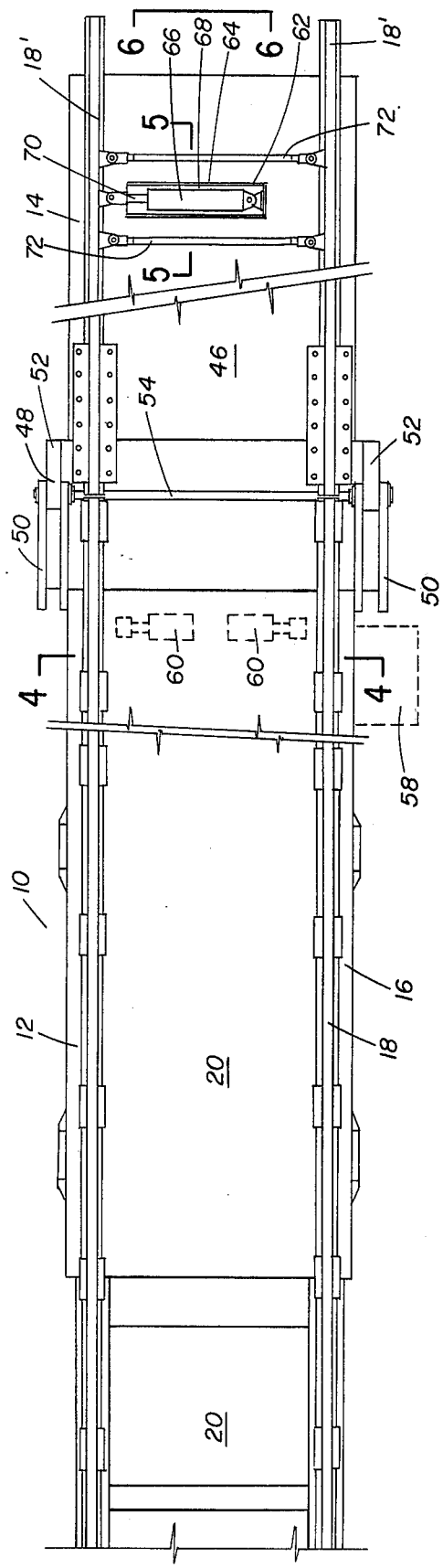
FIG. 2a is a top view of a portion of the rear portion of the railcar transport.

Referring to FIG. 1 and 1a, the railcar transport 10 of the present invention is shown.

The railcar transport 10 comprises an elongated rectangular frame 12 and a railcar ramp 14 pivotally secured to the frame 12.

The elongated rectangular frame 12 comprises a pair of longitudinal side frame members 16 having a pair of rails 18 mounted thereon being secured thereto by any suitable means, such as by clamping, a plurality of cross members 20 (see FIG. 2) secured to the longitudinal side frame members 16 by any suitable means, such as welding, extensible trailer stand 2, power means 24 located on one end of the frame 12, kingpin means 26 and multiaxle trailer suspension means 28 having wheels 30 thereon (shown in phantom). The multiaxle trailer suspension means 28 may be of any suitable type having any number of axles thereon, such as a Model TR-8750 or TR-8900 available from Neway Division, Lear Siegler, Inc., Muskegon, Michigan.

The power means 24 comprises an engine 32, winch 34 and hydraulic pump and tank 36. The winch 34 may be of any suitable type, such as either a gear driven type or hydraulically driven type. The power means 24 is contained on raised support 38 which serves as an operator platform having ladder 40 leading thereto and safety rail 42 therearound.

The railcar ramp 14 comprises a pair of longitudinal members 44 having a pair of rails 18' mounted thereon by any suitable means, such as by clamping, and interconnecting plates 46. The railcar ramp 14 is pivotally secured to one end of the elongated rectangular frame 12 by hinge means 48. The hinge means 48 comprises a first portion 50 secured to the one end of the elongated rectangular frame 12, a second portion 52 secured to one end of the railcar ramp 14 and pin means 54 pivotally securing the first portion 50 to the second portion 52. Mounted below the plane of the pin means 54 located on each side of the elongated rectangular frame 12 are hydraulic cylinder means 56 which are utilized to pivot the railcar ramp 14 relative to the elongated rectangular frame 12. Each hydraulic cylinder means 56 comprises a hydraulic cylinder 58 having one end thereof secured to the elongated rectangular frame 12 and piston rod 60 having one end thereof secured to the railcar ramp 14. The hydraulic cylinder means 56 are supplied pressurized hydraulic fluid from hydraulic pump and tank 36 of the power means 24 through suitable fluid lines (not shown). It should be noted that by mounting the hydraulic cylinder means 56 below the plane of the pin means 54 of the hinge means 48, a one-way acting hydraulic cylinder means may be utilized, if desired, and the railcar ramp has no obstructions thereabove.

Not shown in FIG. 1 or 1a located forward of the hinge means 48 and hydraulic cylinder means 56 and aft of multiaxle trailer suspension means 28 is an operator's stand where the various hydraulic controls are located to operate the various hydraulic components of the railcar transport 10.

Figure 2:
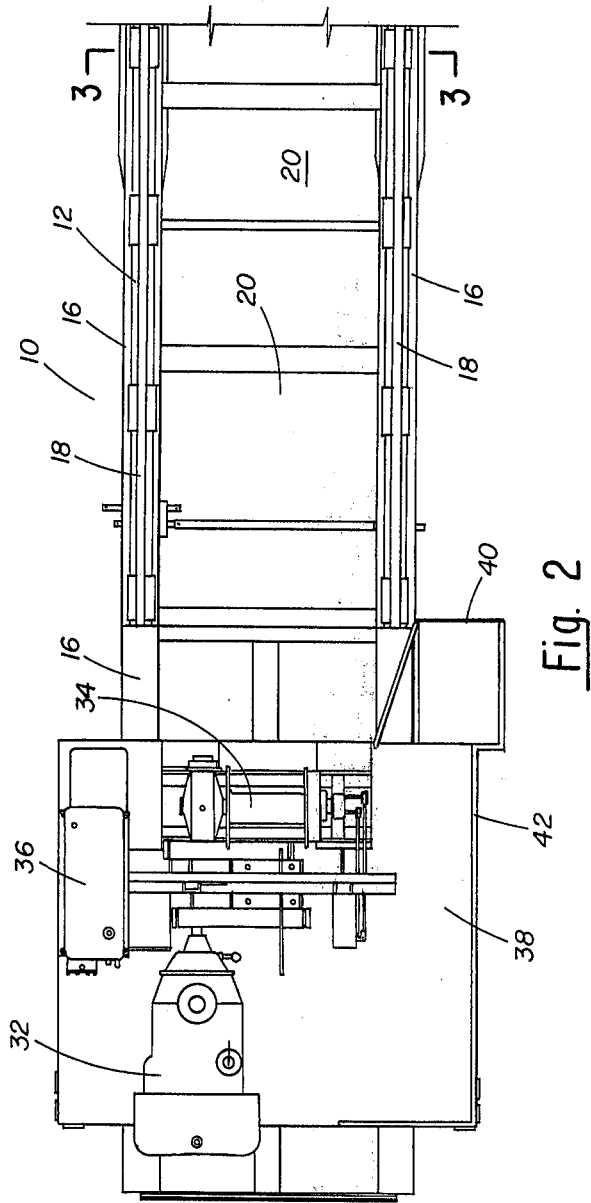
FIG. 2 is a top view of a portion of the front portion of the railcar transport.

Referring to FIGS. 2 and 2a, the cross members 20 securing the longitudinal side frame members 16 are shown. Shown in phantom on one side of the railcar transport is an operator's stand 58. Also shown in phantom, located between the rails 18 near one end of the elongated rectangular frame 12, are hydraulic chocks 60 which are utilized to engage the wheels of a railcar being transported on the railcar transport 10 to prevent the railcar from moving about the railcar transport 10. The hydraulic chocks 60 may utilize any suitable hydraulic actuating means, such as a hydraulic cylinder which may be supplied pressurized hydraulic fluid from the hydraulic pump and tank 36 of the power means, such as a block secured to the end of the rod of a hydraulic cylinder, 24 and may utilize any suitable means to engage the wheels of a railcar being transported on the rail car transport 10.

Located on one end of the railcar ramp 14 is rail alignment means 62 which is utilized to align rails 18' of the railcar transport 10 with the rails of a railroad track in order to facilitate the transfer of a railcar to the transport 10. The rail alignment means 62 comprises support means 64 secured to the railcar ramp 14 intermediate the rails 18' thereon, double acting hydraulic cylinder means 66 having one end of the hydraulic cylinder 68 thereof secured to the support means 64 and one end of the piston rod 70 secured to one of the pair of rails 18' of the railcar ramp 14 and rail connection means 72 interconnecting the pair of rails 18' such that any movement of one of the rails 18' is transferred to the other. The hydraulic cylinder means 66 is supplied pressurized hydraulic fluid from the hydraulic pump and tank 36 of the power means 24.

Figure 3:
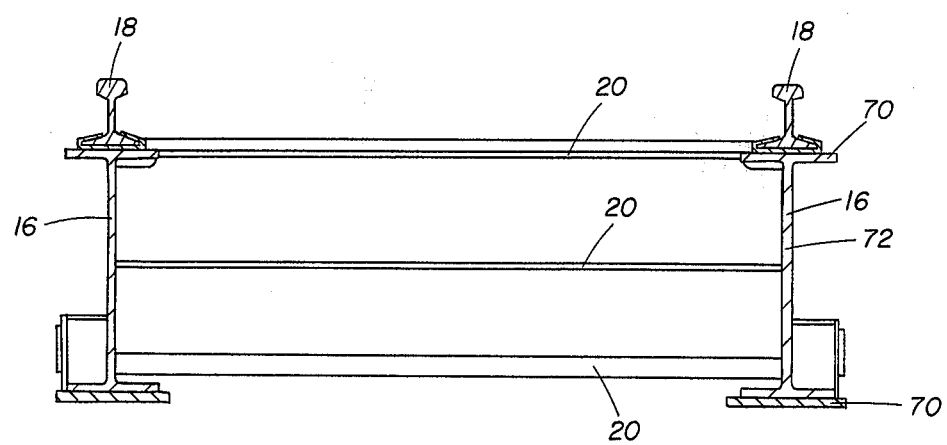
FIG. 3 is a cross-sectional view taken along line 3—3 of FIG. 2.

Referring to FIG. 3, the elongated rectangular frame 12 is shown in cross section. The longitudinal side frame members 16 comprise elongated I-beam shaped members having flanges 70 and interconnecting web 72. The longitudinal side frame members 16 are interconnected by means of cross members 20.

Figure 4:
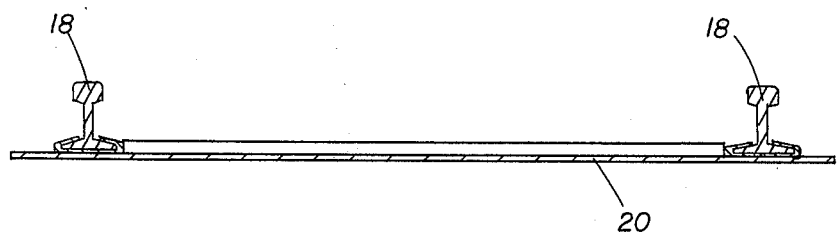

Referring to FIG. 4, the rails 18 are shown in cross section along with member 20'. For clarity, the portion of the underlying structure of the elongated frame 12 has been deleted.

Figure 5:
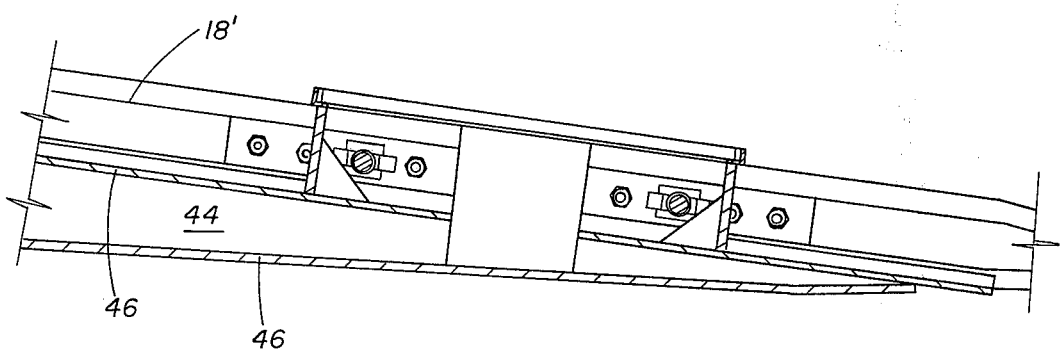

Referring to FIG. 5, the construction of the railcar ramp 14 is shown having the rail alignment means 62 deleted for clarity. The rails 18' are located above longitudinal member 44 which are interconnected by plates 46.

Figure 6:
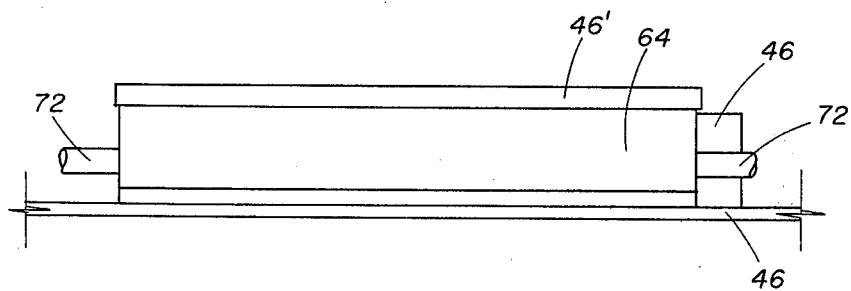

Referring to FIG. 6, the construction of the railcar ramp 14 is further shown. The railcar ramp 14 includes a grating 46' which is installed on the top of a portion of the plate 46 interconnecting the longitudinal members 44.

Figure 7:
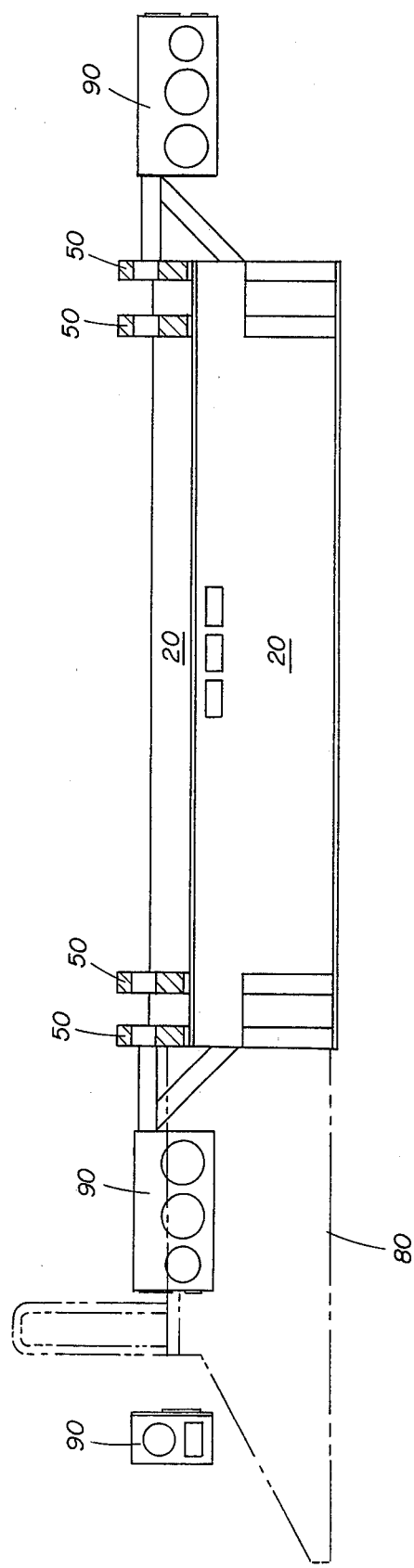

Referring to FIG. 7, the construction of the elongated rectangular frame 12 is shown. Shown in phantom is the outline of the operator's stand 80 which is installed on one side of the elongated rectangular framework 12. The railcar transport 10 further includes suitable lighting and reflector means 90 mounted thereon.

Figure 8:
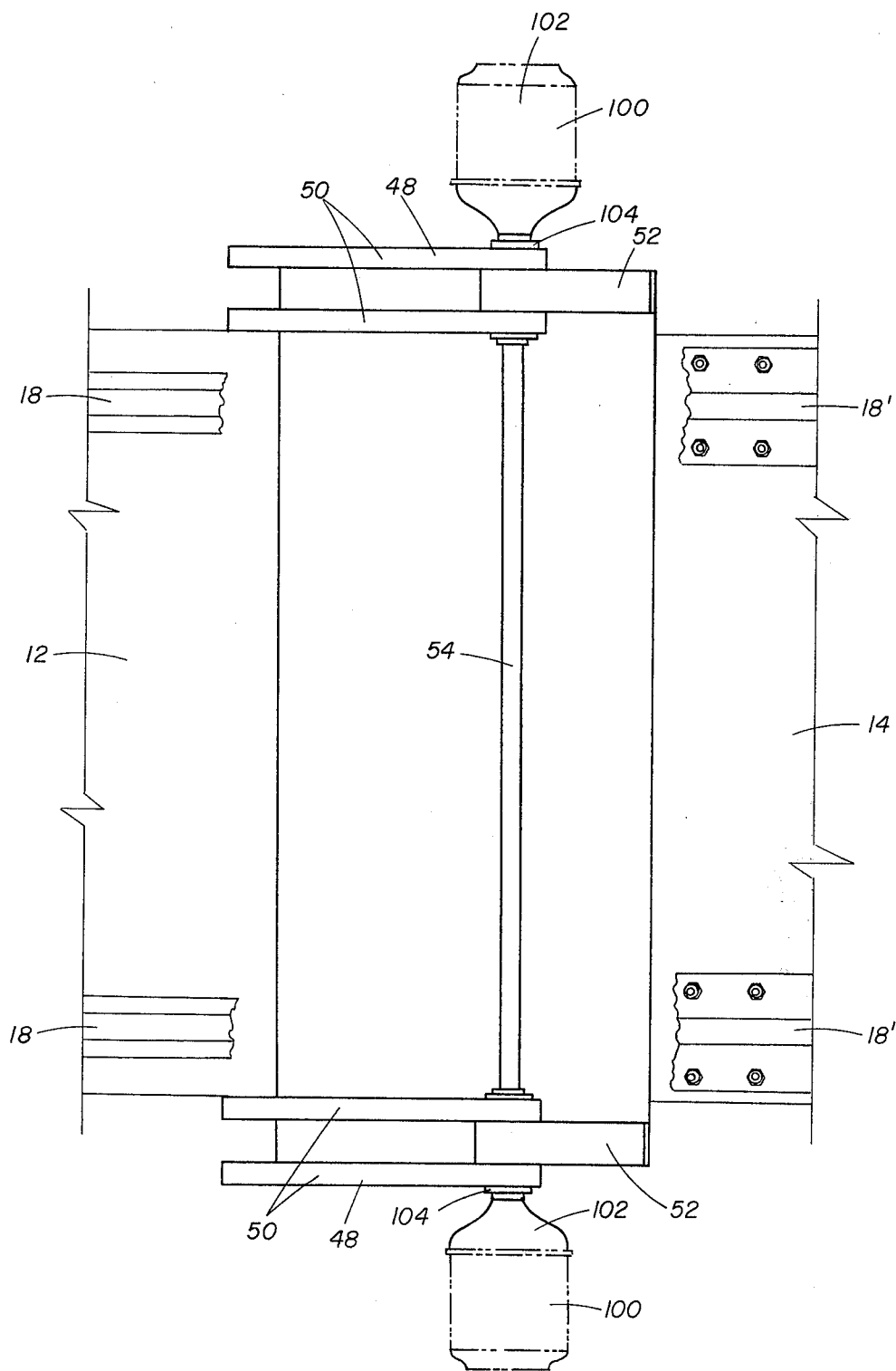
FIG. 8 is a top view of an alternate ramp pivoting means for the railcar transport.

Referring to FIG. 8, an alternative means of moving the railcar ramp 14 relative to the elongated rectangular framework 12 is shown. If it is desired to rotate the railcar ramp 14 about pin means 54 into a vertical or any intermediate position, rather than utilizing hydraulic cylinder means 56, a low speed, high torque hydraulic motor means 100 is utilized. The low speed, high torque hydraulic motor means 100 is mounted having the output shaft (not shown) thereof secured by means of a spline (not shown) to the pin means 54 which is in turn secured to the second portion 52 of hinge means 48 by means of a spline (not shown) while the mounting flange 104 of housing 102 thereof is secured to the first portion 50 of the hinge means 48. The low speed, high torque hydraulic motor means 100 is supplied pressurized hydraulic fluid from hydraulic pump and tank 36 of the power means 24. Any suitable low speed, high torque hydraulic motor means 100 may be used, such as a ROTO-VERSAL ® hydraulic drive available from Gearmatic, a division of Paccar of Canada, Surrey, B.C., Canada.

Figure 9:
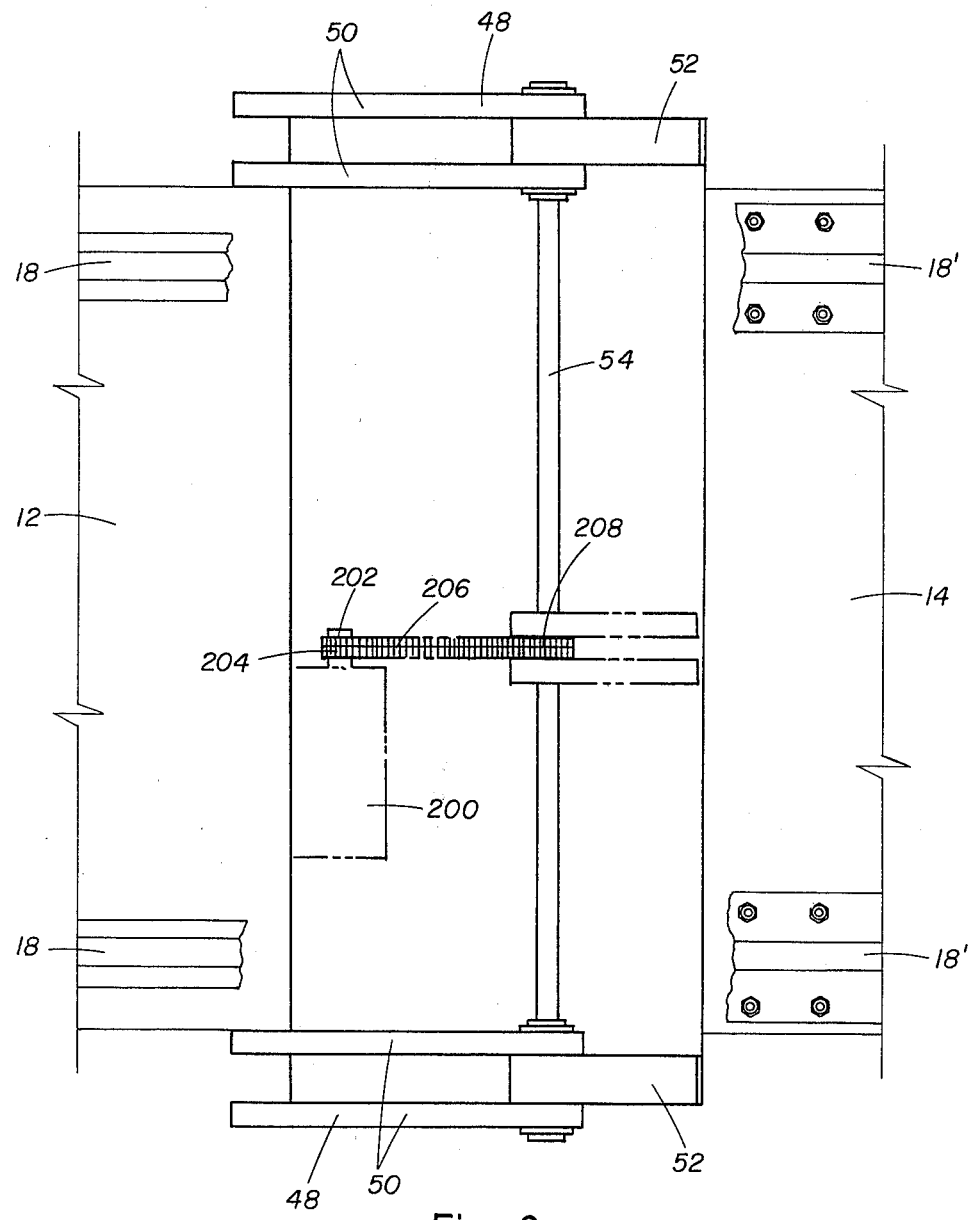
FIG. 9 is a top view of an alternate ramp pivoting means for the railcar transport.

Referring to FIG. 9, another alternative means of moving the railcar ramp 14 relative to the elongated rectangular framework 12 is shown. If it is desired to rotate the railcar ramp 14 about pin means 54 into a vertical or intermediate position, rather than utilizing either hydraulic cylinder means 56 or dual low speed, high torque hydraulic motor means 100, a single high torque hydraulic motor means 200 is utilized. A hydraulic motor 200 is mounted on elongated rectangular frame 12 having the output shaft thereof connected by means of a sprocket 204, chain 206 and sprocket 208 to the pin means 54. The sprocket 208 is secured to the pin means 54 by any suitable means with the ends of pin means 54 being secured to the second portions 52 of the hinge means 48 such that upon rotation of the output shaft 202 of the hydraulic motor 200, the pin means 54 rotates therewith thereby causing the railcar ramp 14 to rotate with respect to the elongated rectangular frame 12. The hydraulic motor means 200 is supplied pressurized hydraulic fluid from hydraulic pump and tank 36 of the power means 24. Any suitable high torque hydraulic motor means 200 may be used, such as a CHAR-LYNN ® 10,000 series hydraulic motor available from Eaton Corporation, Fluid Power Operations, Minneapolis Division, Eden Prairie, Minnesota.

From the foregoing, it can be easily seen that the railcar transport 10 of the present invention offers several advantages over the prior art.

Having thus described my invention, I claim:

1. A railcar transport for transporting a railcar from a first location where said railcar is located on a pair of rails to a second location and for use with a truck tractor towing vehicle, said railcar transport comprising:

elongated rectangular frame means including longitudinal side frame members having a pair of rails located thereon and a plurality of cross members located between the longitudinal side frame members being secured thereto, the elongated rectangular frame means adapted to transport said railcar from said first location to said second location;

engine means located on one end of the elongated rectangular frame means;

winch means located on one end of the elongated rectangular frame means, the winch means powered by the engine means and adapted to move said railcar from said first location onto the elongated rectangular frame means and from the elongated rectangular frame means to said second location;

tank means having a supply of fluid therein connected to hydraulic pump means powered by the engine means thereby supplying the fluid from the tank means under pressure, the hydraulic pump means and tank means being located on one end of the elongated rectangular frame means, kingpin means located on one end of the elongated rectangular frame means for releasably connecting the elongated rectangular frame means to said truck tractor towing vehicle;

trailer suspension means having wheels thereon secured to the elongated rectangular frame means;

railcar ramp means having a pair of rails thereon in juxtaposed relationship to the pair of rails on the elongated rectangular frame means, the railcar ramp means being pivotally mounted on the other end of the elongated rectangular frame means and adapted to provide a ramp upon which said railcar may be conveyed to and from the elongated rectangular frame means;

hinge means having a first portion secured to the other end of the elongated rectangular frame means, having a second portion secured to one end of the railcar ramp means and having pin means rotatably securing the first portion to the second portion, the hinge means adapted to allow rotation of the railcar ramp means relative to the elongated frame means to facilitate transport of said railcar from said first location to said second location after said railcar has been conveyed from said pair of rails on the ramp means to the elongated rectangular frame means by the winch means;

rail alignment means located on the other end of the railcar ramp means between the pair of rails thereon, the rail alignment means adapted to facilitate the alignment of the rails on the ramp means with said pair of rails at said first location by the lateral movement of the rails on the ramp means relative to said pair of rails upon actuation of the rail alignment means when said railcar transport is at said first location having the ramp means at least partially overlying said pair of rails; and hydraulic cylinder means having one end thereof secured to the elongated rectangular frame means and the other end thereof secured to the railcar ramp means to rotate the railcar ramp means relative to the elongated rectangular frame means upon the actuation thereof by the application of the fluid under pressure from the hydraulic pump means.

2. The railcar transport of claim 1 further comprising:

chock means located on the elongated rectangular frame means having a portion thereof extensible over at least one rail of the pair of rails located on the elongated rectangular frame means whereby the chock means prevent the movement in one direction of said railcar relative to the elongated frame means when said railcar is located thereon and the chock means have a portion thereof extended over at least one rail of the pair of rails located on the rectangular frame means.

3. The railcar transport of claim 1 wherein the hydraulic cylinder means are located below the pin means of the hinge means.

4. The railcar transport of claim 1 further comprising:

operator platform means located on one side of the other end of the elongated rectangular frame means, the operator platform means adapted for operation of the engine means, winch means, hydraulic pump means, ramp means, rail alignment means and chock means located on said railcar transport.

5. The railcar transport of claim 1 wherein the rail alignment means comprises:

hydraulic cylinder means having a cylinder housing and a piston rod movable therein, the hydraulic cylinder means having one end thereof secured to the railcar ramp means and the other end thereof secured to one of the pair of rails located on the railcar ramp means; and rail connection means interconnecting the pair of rails on the railcar ramp means to cause movement of one of the pair of rails to be transferred to the other of the pair of rails.

6. A railcar transport for transporting a railcar from a first location where said railcar is located on a pair of rails to a second location and for use with a truck tractor towing vehicle, said railcar transport comprising:

elongated rectangular frame means including longitudinal side frame members having a pair of rails located thereon and a plurality of cross members located between the longitudinal side frame members being secured thereto, the elongated rectangular frame means adapted to transport said railcar from said first location to said second location;

winch means located on one end of the elongated rectangular frame means, the winch means powered by the engine means and adapted to move said railcar from said first location onto the elongated rectangular frame means and from the elongated rectangular frame means to said second location;

hydraulic pump means and tank means located on one end of the elongated rectangular frame means;

kingpin means located on one end of the elongated rectangular frame means for releasably connecting the elongated rectangular frame means to said truck tractor towing vehicle;

trailer suspension means having wheels thereon secured to the elongated rectangular frame means;

chock means located on the elongated rectangular frame means having a portion thereof extensible over at least one rail of the pair of rails located on the elongated rectangular frame means;

railcar ramp means having a pair of rails thereon in juxtaposed relationship to the pair of rails on the elongated rectangular frame means, the railcar ramp means being pivotally mounted on the other end of the elongated rectangular frame means and adapted to provide a ramp upon which said railcar may be conveyed to and from the elongated rectangular frame means;

hinge means having a first portion secured to the other end of the elongated rectangular frame means, having a second portion secured to one end of the railcar ramp means and having pin means rotatably securing the first portion to the second portion, the hinge means adapted to allow rotation of the railcar ramp means relative to the elongated frame means to facilitate transport of said railcar from said first location to said second location after said railcar has been conveyed from said pair of rails on the ramp means to the elongated rectangular frame means by the winch means;

rail alignment means located on the other end of the railcar ramp means between the pair of rails thereon, the rail alignment means adapted to facilitate the alignment of the rails on the ramp means with said pair of rails at said first location by the lateral movement of the rails on the ramp means relative to said pair of rails upon actuation of the rail alignment means when said railcar transport is at said first location having the ramp means at least partially overlying said pair of rails; and motor means for rotating the railcar ramp means relative to the elongated rectangular frame means, the motor means being actuated by fluid under pressure from the hydraulic pump means.

7. The railcar transport of claim 6 further comprising:
operator platform means located on one side of the elongated rectangular frame means, the operator platform means adapted for operation of the engine means, winch means, hydraulic pump means, ramp means, rail alignment means and chock means located on said railcar transport.

8. The railcar transport of claim 6 wherein the rail alignment means comprises:
hydraulic cylinder means having a cylinder housing and a piston rod movable therein, the hydraulic cylinder means having one end thereof secured to the railcar ramp means and the other end thereof secured to one of the pair of rails located on the railcar ramp means; and
rail connection means interconnecting the pair of rails on the railcar ramp means to cause movement of one of the pair of rails to be transferred to the other of the pair of rails.

9. The railcar transport of claim 6 wherein the motor means comprises:
low speed, high torque hydraulic motor means having a first portion thereof secured to the first portion of the hinge means and a second portion thereof secured to the pin means of the hinge means.

10. The railcar transport of claim 6 wherein the motor means comprises:
high torque hydraulic motor means secured to the elongated rectangular frame means having the output shaft thereof secured to the railcar ramp means.

11. A railcar transport for transporting a railcar from a first location where said railcar is located on a pair of rails to a second location and for use with a truck tractor towing vehicle, said railcar transport comprising:

elongated rectangular frame means including longitudinal side frame members having a pair of rails located thereon and a plurality of cross members located between the longitudinal side frame members being secured thereto, the elongated rectangular frame means adapted to transport said railcar from said first location to said second location;

winch means located on one end of the elongated rectangular frame means, the winch means powered by the engine means and adapted to move said railcar from said first location onto the elongated rectangular frame means and from the elongated rectangular frame means to said second location;

hydraulic pump means and tank means located on one end of the elongated rectangular frame means;

kingpin means located on one end of the elongated rectangular frame means for releasably connecting the elongated rectangular frame means to said truck tractor towing vehicle;

trailer suspension means having wheels thereon secured to the elongated rectangular frame means;

chock means located on the elongated rectangular frame means having a portion thereof extensible over at least one rail of the pair of rails located on the elongated rectangular frame means whereby the chock means prevent the movement in one direction of said railcar relative to the elongated frame means when said railcar is located thereon and the chock means have a portion thereof extended over at least one rail of the pair of rails located on the rectangular frame means;

railcar ramp means having a a pair of rails thereon in juxtaposed relationship to the pair of rails on the elongated rectangular frame means, the railcar ramp means being pivotally mounted on the other end of the elongated rectangular frame means and adapted to provide a ramp upon which said railcar may be conveyed to and from the elongated rectangular frame means;

hinge means having a first portion secured to the other end of the elongated rectangular frame means, having a second portion secured to one end of the railcar ramp means and having pin means rotatably securing the first portion to the second portion, the hinge means adapted to allow rotation of the railcar ramp means relative to the elongated frame means to facilitate transport of said railcar from said first location to said second location after said railcar has been conveyed from said pair of rails on the ramp means to the elongated rectangular frame means by the winch means;

rail alignment means located on the other end of the railcar ramp means between the pair of rails thereon, the rail alignment means adapted to facilitate the alignment of the rails on the ramp means with said pair of rails at said first location by the lateral movement of the rails on the ramp means relative to said pair of rails upon actuation of the rail alignment means when said railcar transport is at said first location having the ramp means at least partially overlying said pair of rails; and hydraulic cylinder means having one end thereof secured to the elongated rectangular frame means and the other end thereof secured to the railcar ramp means to rotate the railcar ramp means relative to the elongated rectangular frame means upon the actuation thereof by the application of the fluid under pressure from the hydraulic pump means.

12. The railcar transport of claim 11 wherein the rail alignment means comprises:

hydraulic cylinder means having a cylinder housing and a piston rod movable therein, the hydraulic cylinder means having one end thereof secured to the railcar ramp means and the other end thereof secured to one of the pair of rails located on the railcar ramp means; and rail connection means interconnecting the pair of rails on the railcar ramp means to cause movement of one of the pair of rails to be transferred to the other of the pair of rails.

* * * * *

UNITED STATES PATENT AND TRADEMARK OFFICE
CERTIFICATE OF CORRECTION

PATENT NO. : 4,375,343
DATED : March 1, 1983
INVENTOR(S) : William S. Butler

It is certified that error appears in the above-identified patent and that said Letters Patent are hereby corrected as shown below:

In column 1, line 59, delete the word [which] and insert therefor --while--.

In column 2, line 50, delete the number [2] and insert therefor --22--.

Signed and Sealed this

Tenth Day of May 1983

[SEAL]

Attest:

Attesting Officer

GERALD J. MOSSINGHOFF
Commissioner of Patents and Trademarks